April 20, 1954  M. ENGLER  2,675,854
TUBE SPLICING METHOD
Filed Sept. 19, 1950  3 Sheets-Sheet 1

INVENTOR.
Max Engler
BY
Evans + McCoy
ATTORNEYS

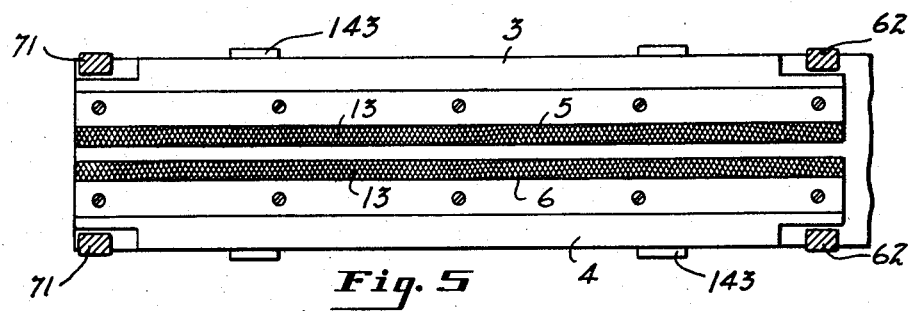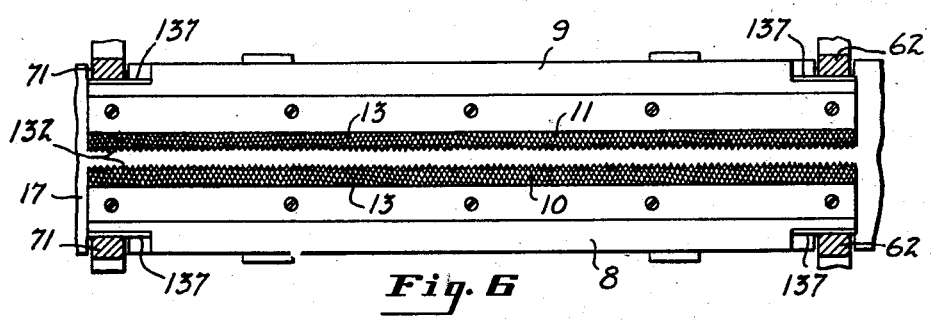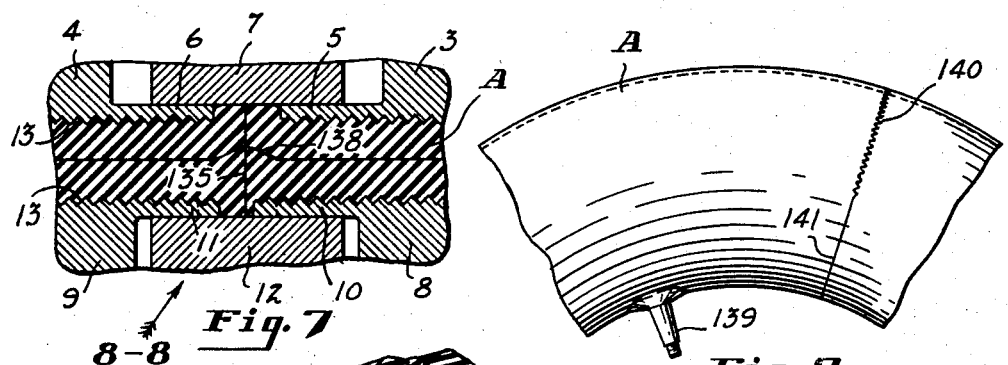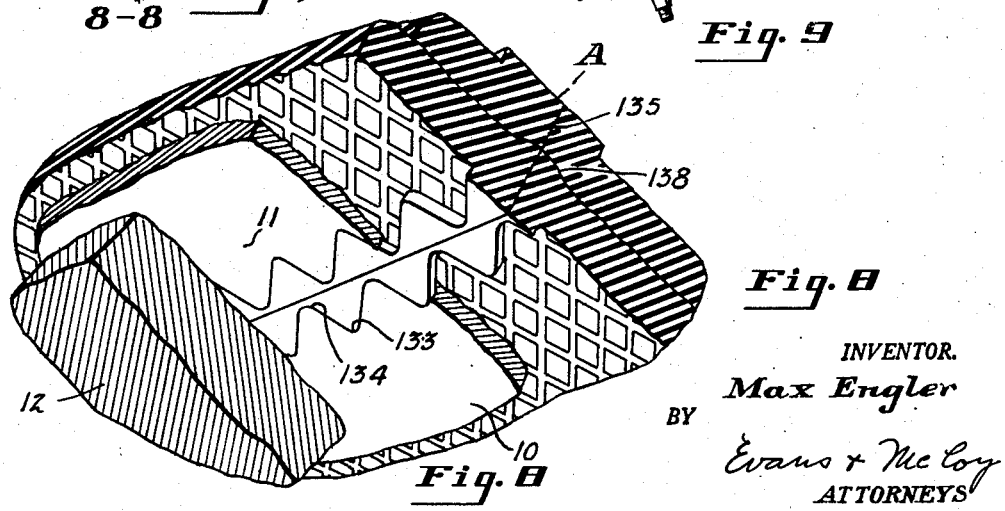

April 20, 1954     M. ENGLER     2,675,854

TUBE SPLICING METHOD

Filed Sept. 19, 1950     3 Sheets-Sheet 3

INVENTOR
*Max Engler*
BY *Evans & McCoy*
ATTORNEYS

Patented Apr. 20, 1954

2,675,854

UNITED STATES PATENT OFFICE 2,675,854

TUBE SPLICING METHOD

Max Engler, Akron, Ohio, assignor to The General Tire and Rubber Company, Akron, Ohio, a corporation of Ohio Application September 19, 1950, Serial No. 185,640

7 Claims. (Cl. 154—14)

This invention relates to a method of splicing inner tubes of vulcanizable material prior to vulcanization, the method and apparatus being particularly useful for splicing tubes made of so called "synthetic" rubber material such as butyl rubber which is less tacky and more fluent under pressure than natural rubber, although, of course, the invention also is useful in connection with the splicing of all rubber tubes and the like. Reference is made to copending application for patent, Serial No. 768,215, filed August 12, 1947, now Patent No. 2,534,252, issued December 19, 1950, for Tube Splicer, of which this is a continuation in part.

Because of the fact that butyl rubber is softer and less adhesive than natural rubber, great difficulty has been experienced in making satisfactory splices between the ends of an automobile tire inner tube prior to vulcanization. Tube splicing methods and machines for the splicing of tubes made of natural rubber have not been entirely satisfactory for butyl rubber tubes because of tube distortion at the splice due to excessive flow of the rubber under pressure. In addition, many splices prove to be defective because of poor adhesion between the tube ends.

One of the principal objects of the present invention is to provide a method of splicing the ends of tubular rubber stock in such a manner that the thickness of the tube wall along the splice line is relatively thicker on one side of the tube than the other. Such thickening of the tube wall permits the tubular stock to be bent around a radius when inflated with less likelihood that the spliced ends will separate, the portion of the splice line having thickened wall being disposed on the outside of the curve. This feature of the invention has particularly useful application in the manufacture of vehicle tire inner tubes. The tubular rubber stock is customarily formed by an extrusion process in continuous strip form. This strip is cut into lengths and the individual pieces or lengths are formed into a loop or closed tubes by abutting and stitching together the ends thereof. To cure each of the inner tubes so formed it is inflated in a heated mold, the tube taking the form of a torus in which the outer circumference is stretched more than the inner circumference. In the method of the present invention the portion of the initial pressure splice which is disposed on the outer circumference of the torus is thickened so that the splice has increased strength to resist being parted under the inflation pressure used.

Another object is to provide an improved interlock between the gripping elements of the tube engaging bars of splicers and the rubber stock so as to resist slippage or movement of the tube stock relative to the gripping elements.

Another object is to provide a method of splicing tubes by which good adhesion is obtained between the ends of a butyl rubber inner tube without distortion of the tube at the splice.

A further object of the invention is to provide a generally improved method of splicing tubes which is simple and inexpensive. Other objects and advantages will become apparent from the following detailed description of the invention and suitable apparatus for use in connection therewith. Only so much of the apparatus is shown as is necessary to illustrate the principles of the invention, it being understood that the parts of the machine not shown may be the same as those of other machines of similar type known to the art, such as the apparatus of United States Patent No. 2,562,540, issued July 31, 1951. The description is made in connection with the accompanying drawings forming a part of this specification.

In the drawings:

Fig. 5 is a plan view of the upper platen partly in section and with parts broken away, this view being taken substantially along the line indicated at 5—5 of Fig. 2;

Fig. 6 is a plan view of the lower platen partly in section and with parts broken away, this view being taken substantially along the line indicated at 6—6 of Fig. 2;

Fig. 7 is an enlarged fragmentary detail in section showing the clamping bars and the serrated flanges thereof in contracted position and interlocked with the rubber stock of a tube being spliced;

Fig. 8 is a diagrammatic, fragmentary perspective view partly in section and with parts broken away illustrating on an enlarged scale the interlocking of the serrated flanges of the clamping bars or elements with the rubber stock or material of the tube being spliced, this view being taken generally in the direction of the arrow shown in Fig. 7;

Fig. 9 is a fragmentary elevational view of the spliced inner tube in inflated condition prior to vulcanization;

Figure 11:
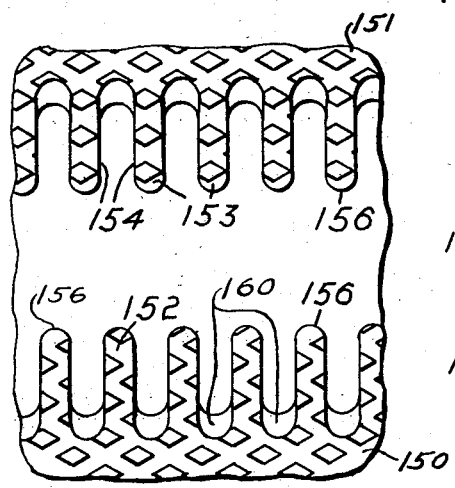
Fig. 11 is a fragmentary plan view of a portion of the companion gripping bars of Fig. 10 being enlarged with respect to that figure to show the construction and arrangement of the confronting fingers formed along the edges of the gripper bar edges.
Figure 12:
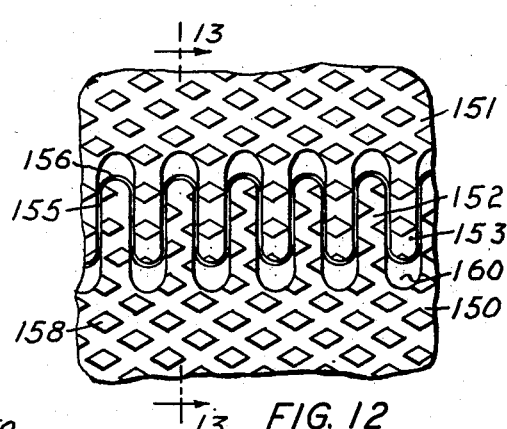
Figure 13:
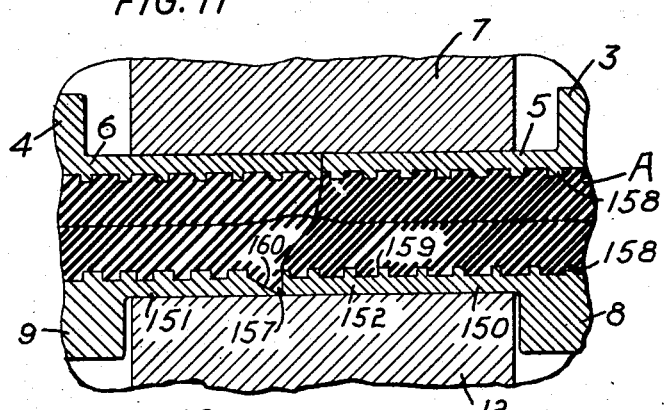

Fig. 12 is a fragmentary plan view similar to Fig. 11 showing the interleaved arrangement of the fingers when the gripper bars are together in the splicing operation; and Fig. 13 is a fragmentary sectional detail similar to Fig. 7 showing the relationship between the gripper bars and the rubber stock of the tubes being spliced when the spicer is in closed position, the direction of this view being indicated along the line 13—13 of Fig. 12 although the rubber stock is not shown in the latter figure.

In the following description of the present invention like parts throughout the several views have been indicated by the same numerals of reference.

*General description of splicing process*

Figure 1:
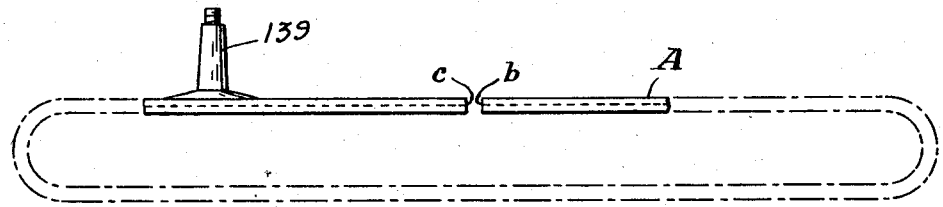
Figure 1 is a side elevation, partly diagrammatic, of a vehicle tire inner tube to be spliced by abutting the ends thereof.

Tube A to be spliced, formed of unvulcanized or raw rubber or the like, has its ends cut in planes at right angles to the length of the tube to provide square, clean ends b and c (Fig. 1) for adhesive contact. The tube is flattened transversely prior to the cutting of the ends b and c. After the cutting operation the ends b and c are placed in contact and the tube ends are pressed in the machine of the present invention between bed and movable platens so as to completely flatten the ends of the tube and bring the abutting edges into full contact throughout the width of the flattened tube.

After the initial pressing operation the tube ends are engaged on opposite sides by parallel gripping means. On their upper surfaces they are engaged by a pair of upper gripping bars 3 and 4 which have thin flanges 5 and 6 projecting from their opposing edges, forming part of the gripping faces of the two bars. The flanges 5 and 6, directed toward one another, provide a recess between the bars 3 and 4 in which is mounted a gap closing bar 7 which bridges the gap between the flanges 5 and 6 and lies against the latter. The under sides of the tube ends are engaged by gripping bars 8 and 9 similar to the bars 3 and 4 and which have flanges 10 and 11 corresponding to flanges 5 and 6. A second gap closing bar 12 is mounted in the recess formed by the flanges 10 and 11, underlying the latter, and bridges the space between the edges of the flanges 10 and 11.

The gap closing bars 7 and 12 preferably are made of brass or similar material to reduce frictional resistance with the steel flanges 5, 6, 10 and 11. The tube gripping faces of the flanges 5, 6, 10 and 11 preferably are sharply knurled or otherwise charactered as shown at 13 (Figs. 5 and 6) to provide more effective gripping of the tube and to thereby prevent slippage of the tube ends.

Figures 3, 4:
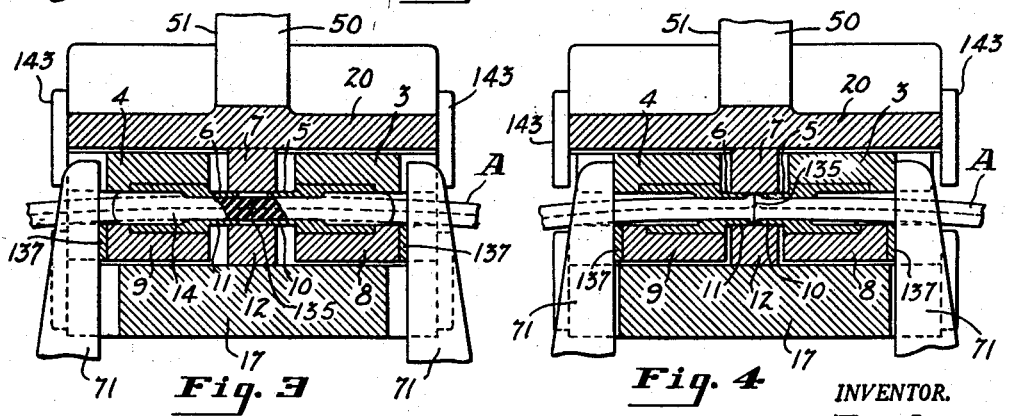
Fig. 3 is a sectional detail taken substantially on the line indicated at 3—3 of Fig. 2 and enlarged with respect to that figure, the clamping bars being shown retracted.
Fig. 4 is a sectional detail corresponding to Fig. 3 showing the clamping bars contracted or advanced.
Figure 10:
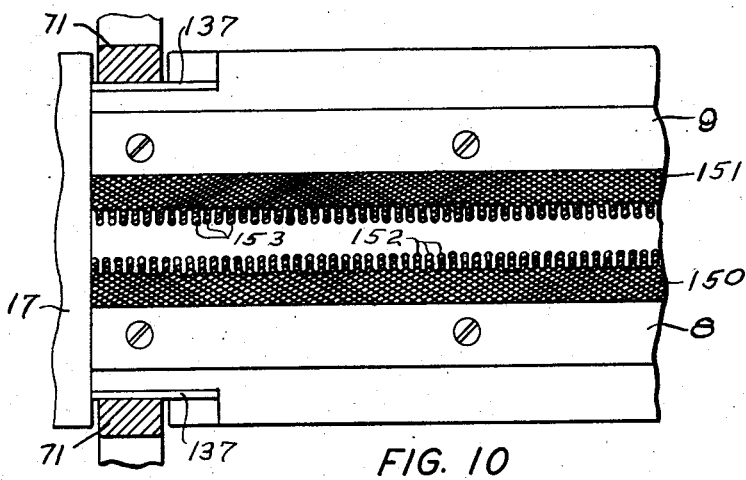
Fig. 10 is a fragmentary plan view of the lower platen partly in section and with parts broken away and removed showing modified gripping bars, this view corresponding to the left-hand end of Fig. 6 to show the bars in the open or stock receiving position and being enlarged with respect to that figure.

With the two flattened tube ends firmly gripped between the opposed bars 3 and 8 and 4 and 9 as shown in Fig. 3 of the drawings, gripping pressure is applied for a time interval or initial "setting" period sufficient to permit the knurling 13 to sink somewhat into the faces of the tube to improve the grip on the tube ends after which the two pairs of gripping bars are moved, one pair toward the other and while the gripping pressure is maintained, to apply endwise pressure to the abutting tube ends, as shown in Fig. 4. This movement pushes the gripped portions of the tube toward each other until the tube material at the splice contacts the confining walls. The gap closing bars 7 and 12 are held against the flanges 5 and 6 and 10 and 11 during this movement so that the lateral flow of rubber is confined to the very limited space provided between the edges of the thin flanges.

In order to prevent lateral flow of rubber from the splice at the opposite side edges of the tubes, blocks of sponge rubber 14 are inserted between the tube gripper bars and against opposite side edges of the tube A. These blocks of rubber which bridge the space between the two pairs of grippers when compressed between the gripper bars press inwardly against the opposite side edges of the tube and prevent spreading of the edge portions of the tube due to lateral flow of rubber. If two or more tubes are spliced in the machine at the same time, their side edges are placed together and the rubber blocks 14 are used only on the outer edges of the outer tubes.

With the tube A confined between the gripper bars and the rubber blocks 14, pressure is maintained on the tube ends for a substantial time interval sufficient to cause the tube ends to firmly adhere so that subsequent vulcanization will cause complete joining of the rubber at the splice.

*General description of suitable apparatus for using present method*

The operations above described are conveniently performed in a tube splicing machine having a flat table or bed 16 which provides support for the inner tubes while they are being spliced. A lower elongated platen 17 is supported cantilever fashion in a fixed horizontal position a short distance above the table 16, the platen 17 being rigidly attached at its inner end to a standard that is a rigid part of the machine frame and that extends above the level of the table 16. A carriage 19 is slidably mounted on the machine frame for vertical movement above the level of the platen 17 and an upper platen 20 is pivoted at its inner end to the carriage 19 to swing vertically. The carriage 19 is spring supported in an elevated or inactive loading position, the platen 20 being supported in a position far enough above the platen 17 to provide convenient clearance for insertion thereunder of a tube to be spliced, or removal of a spliced tube.

The gripping pressure exerted upon a tube being spliced is merely that required to compress a spring which acts on a movable head carrying the upper platen 20. The spring arrangement insures uniformity of pressure during the splicing operation and an elastic connection that accommodates tubes of different thicknesses.

The gap closing bars 7 and 12 are confined between the flanges of the gripper bars and the platens 6 upon which the gripper bars are mounted. Normally the gripper bars are held in their outermost or retracted positions by helical coil springs interposed between the gap closing bars and the gripper bars. Anti-friction bearings, not shown, are interposed between the gripper bars 3 and 4 and the upper platen and also between the gripper bars 8 and 9 and the lower platen. Dove-tail ribs 61 on the upper bars 3 and 4 are slidingly received in corresponding undercut grooves formed in the under face of the upper platen 20 to support the gripper bar. Depending stops 143 help by screws to the side faces of the upper platen limit lateral shifting movement of the upper gripper bars; similar stops are also provided on the lower platen 17 to limit movement of the gripper bars 8 and 9.

*Provision of mechanical interlock of rubber and grippers*

On the confronting edges of the thin flanges 10 and 11 of the lower gripper bars 8 and 9 are closely spaced notches 132 which form serrated edges on the flanges. These notches are preferably of substantially V shape having narrow bottoms 133 and relatively sharp points 134. As pressure applied by the upper platen 20 to the gripper bars 3 and 4 compresses the end portions of the tubular rubber stock between the flanges 6 and 11 of the gripper bars 4 and 9 on one hand and the flanges 5 and 10 of the gripper bars 3 and 8 on the other hand, the rubber material is forced into the spaces or pockets formed by the notches 132 and the adjacent portions of the face of the lower gap closing bar 12. During the dwell period of the machine while the clamping bar pressure is maintained on the rubber stock of the tube being spliced the rubber material flows into the closely spaced pockets formed by the serrated edges of the gripper bar flanges 10 and 11 becoming intimately interlocked therewith. This interlocking connection between the rubber stock and the gripper bar flanges strongly resists relative movement of the rubber on the gripper bars during the subsequent compacting together of the abutted tube ends along splice line 135 formed by the abutted ends b and c.

Figure 2:
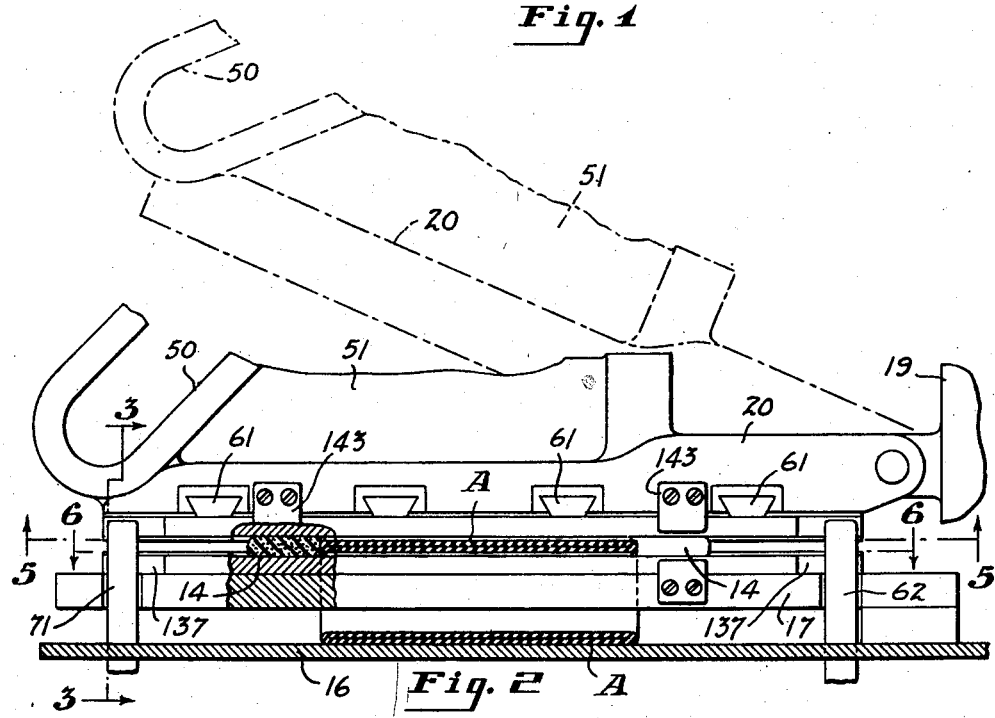
Fig. 2 is a transverse sectional view through the tube supporting table of the splicing apparatus or machine showing the tube clamping platens in side elevation, parts being in section and parts being broken away and removed.

When the machine is idle, as between splicing operations on successive tubes, the upper platen 20 is normally in the raised position indicated by the broken line of Fig. 2, the outer end of the lower platen 17 being free to receive a tube to be spliced. The abutted ends b and c of a tube to be spliced are then disposed so that they rest upon the top face of the lower platen with the body of the tube supported upon the table 16. The splice line is centered or disposed to lie along the lower gap closing bar 12. The machine is then operated to close the platens so that the tube is gripped therebetween. The machine is allowed to dwell with the abutted tube ends clamped between the platen for a substantial period of time sufficiently long for the gripping bar flanges to sink into the rubber material and for the tube stock to flow into the small cups or chambers formed by the serrations 132.

After the initial dwell period with the platens closed the tube gripping bars are contracted or moved toward the center or gap spanning bars 7 and 12 to apply endwise pressure to the abutting faces b and c of the tube ends. This action is by means of an actuating mechanism mounted in the frame of the machine and including a pair of rear actuating arms 62 and a pair of front actuating arms 71. The arms 62 are mounted at their lower ends on fixed horizontal pivots and are supported in substantially upright position on opposite sides of the platen 17 and extend upwardly through the table 16.

The front actuating arms 71, similar to the arms 62, are pivoted at their lower ends to a vertically movable slide and are movable from a position entirely below the surface of the table 16 to a position straddling the outer end of the platens 17 and 20 for engagement with the gripper bars carried by the platens. The arms 71 are first elevated to operative position with respect to the gripper bars, and are then actuated simultaneously with the actuation of the arms 62 to apply pressure to the gripper bars of both platens.

*Provision of thick splice on outside of tube*

Between each of the bottom gripper bars 8 and 9 and the actuating arms 62 and 71 are disposed spacers or shims 137 which are engaged by the actuating arms prior to contact between such arms and the upper gripper bars 3 and 4. Accordingly the contracting movement or shifting together of the bottom gripper bars is initiated slightly ahead of or prior to the moving together of the upper gripper bars 3 and 4. In the present instance the shims 137 are secured by screws on the side faces by the bottom gripper bars 8 and 9. They may, however, be mounted on the actuating arms 62 and 71. Furthermore, instead of shims a similar initial shifting movement of one set of the gripper bars can be produced by making such pair of gripper arms wider than the other, by forming recesses in the side faces of one set of the gripper bars to receive the actuating arms, or by forming protruding bosses on the gripper bars or actuating arms. The effect of the initial movement of one set of gripper bars ahead of the other is to move them over a longer path than the path over which the other set of gripper bars is shifted.

By reason of moving one pair of the gripper bars over a longer path than the other a greater movement is imparted to the rubber stock adjacent and along the splice line on one side of the rubber tube than on the other side of the tube. As shown in Fig. 7, the movement of the bottom gripper bars 8 and 9 over a longer path than that of the gripper bars 3 and 4 produces a localized swelling of the bottom half of the abutted tube sections as indicated at 138. Thus the tube side walls contacted by the faces of the bottom gripper bars 8 and 9 are increased in thickness along and adjacent the splice line 135, there being a corresponding decrease in thickness and section of the tube side wall contacting the upper gripper bars 3 and 4.

The splicing machine is held motionless, with the gripper bars in contracted or closed positions, for a sufficiently long period of time to allow the butting faces b and c of the tube ends to become firmly adhered or "stitched" together along the splice line 135. Thereafter the tube is withdrawn from between the platens 17 and 20 and inflated through valve 139. Prior to complete inflation the tube is reversed from the position of Fig. 1 so that the valve 139 is disposed on the inside of the torus as is conventional with vehicle tire inner tubes. This reversal of the inner tube places the thickened portion of the splice formed by the serrated flanges 10 and 11 on the outer periphery of the inflated tube, this portion of the splice being indicated at 140 (Fig. 8). It is this portion of the splice, disposed across the outer circumference of the inflated annular tube, which is more highly stressed and subject to strains which tend to separate the edges of the splice. It is therefore extremely advantageous to have that portion of the splice which is across the outer circumference of the inflated annulus of increased thickness, as provided by the method of the present invention.

The relative decrease in thickness of the tube wall across the inner circumference of the inflated annular tube, this portion of the splice being indicated at 141, is not seriously objectionable since only relatively small forces are present along the inner circumference of the inflated tube tending to separate the tube ends along the splice line.

The desired relative increase in thickness along the splice line of one of the tube walls relative to the other can also be obtained by simultaneously initiating the movement of both pairs of gripper bars and continuing the contracting movement of one pair after the other pair of gripper bars has stopped, or by moving one pair faster or at a greater rate of speed than the other.

It is furthermore apparent that it is a thickening of one wall of the tube along the splice line relative to the thickness of the other wall of the tube that is provided by the present invention. Both walls of the tube may, of course, be thickened along the splice line relative to the normal thickness of the tube walls by increasing the thickness of the tube contacting flanges 5, 6, 10 and 11 or by altering the contour of the rubber contacting faces of such flanges.

In Figs. 10 through 13 is illustrated a modification in which the lower gripping bars 8 and 9 are formed with thin flanges 150 and 151, respectively, disposed in the same plane and directed toward one another. The flanges 150 and 151 have interfitting fingers 152 and 153 and are employed in lieu of the flanges 10 and 11 described in connection with Figs. 3 through 8.

Each of the fingers 152 and 153 has a length several times its width. In the illustrated arrangement, the fingers are approximately three times as long as they are wide. The sides of of the fingers are in the form of confronting substantially flat parallel surfaces 154, surfaces between adjacent fingers being slightly greater than the width of the companion fingers. Thus, when the fingers are intermeshed, as shown in Fig. 12, a clearance 155 occurs between the confronting side faces of the fingers. In setting up the machine the gripper bars are adjusted so that this clearance is continuous across rounded ends 156 of the fingers and the clearance is of serpentine arrangement and continuous across the entire extent of the splicer.

In the splicing operation, the pressure on the rubber stock forces it into the clearance space 155 in the formation of a continuous rind 157 (Fig. 13). This rind, during the formation of the splice, is of serpentine configuration by reason of the interfitting relation of the companion fingers 152 and 153. Upon release of the tube from the splicer, however, the inherent resiliency of the rubber stock may cause a recovery of the rind from the serpentine configuration to a serrated edge or similar configuration in which the serrations on opposite edges are in staggered relation.

As a further feature of the modification of Figs. 10 through 13, knurling or charactering of the rubber contacting faces of the flanges 150 and 151 is provided by diagonal cuts made as by a rotary milling tool or the like. These cuts intersect to form diamond shaped lands or knobs 158 spaced over the rubber contacting surfaces of the flanges including the rubber contacting faces of the fingers 152 and 153. A preferable manufacturing procedure involves the cutting of the grooves in the formation of the knobs 158 prior to the formation of the fingers 152 and 153.

While it is feasible to vary the width and length of the fingers 152 and 153 to suit the particular requirements of rubber stock being spliced, it has been found satisfactory for the general splicing of passanger tire inner tubes of butyl rubber to space the fingers at approximately ⅛ inch intervals along the edges of each of the flanges. Spacing the fingers ⅛ inch on center in this manner permits the individual fingers each to be made approximately 3/64 inch in width with the spaces between adjacent fingers approximately 5/64 inch in width. Thus, the clearance space 155 that accommodates the serpentine shaped rind is approximately 1/64 inch in width. The fingers are approximately 11/64 inch in length from the rounded tips 156 to the relatively sharp edge of the oblique face 160.

The fingers may be formed along the edges of the flanges 150 and 151 by means of a rotary cutter, the cutter being indexed along the edge of the flange between tooth cutting operations. The rotary axis of the cutter may be disposed parallel to the plane of the flange and also may be displaced on that side of the flange which has the diamond characters 158 so that root surfaces 160 between adjacent fingers are oblique to the plane of the flanges. These oblique root faces, continuous with the side faces 154 of the fingers, provide relatively thick tapered base portions on the rind 157 where such rind extends around the ends of the fingers.

The provision of the continuous rind and the incorporation therein of the heavy sectioned portions at the finger ends, combined with the kneading together of the abutted tube ends in the splicing operation, gives a strong bond which results in a thickened joint highly resistant to separation under tension.

In the forcing together of the abutted tube ends in the splicing operation, the diamond shaped knobs 158 effect a non-slipping grip on the faces of the rubber stock, the knobs having relatively sharp edge corners 159 which bite into the rubber stock. During the initial "setting" when the rubber tube ends are clamped for an interval of time between the flange pairs 5 and 150 and 6 and 151, the rubber stock flows into the channels or spaces between the knobs 158 so that a positive interlock is obtained between the stock and the gripping flanges. This interlocking of the rubber faces is continuous not only over the surfaces but also over the rubber engaging faces of the fingers 152 and 153. In the modification of Figs. 10 through 13, the diamond knobs 158 may be formed on the flanges 5 and 6 as well as on the fingered flanges 150 and 151, this feature being shown in Fig. 13.

The principles of the present invention may be utilized in various ways, numerous modifications and alterations being contemplated, substitution of parts and changes in construction being resorted to as desired, it being understood that the particular method set forth is given merely for purposes of explanation and illustration without intending to limit the scope of the claims to the specific details disclosed.

What I claim is:

1. In the method of splicing tubular rubber stock which comprises abutting freshly cut ends of the stock in a flattened condition, frictionally engaging both sides of the abutted ends across substantially the entire width of the flattened tubular stock, and moving the frictionally engaged sides relatively toward one another to compress the abutted ends, the improvement which comprises moving the stock on one side of the tube a greater distance than the stock on the other side thereof whereby the mass of rubber disposed along the splice on said one side is relatively greater than the mass of rubber disposed along the splice on the other side of the tube.

2. In the method of splicing an uncured rubber tube by rendering the tube ends tacky, clamping the flattened tube ends in mating abutment by frictionally engaging the opposite sides of the ends, and longitudinally compressing the abutted ends while so clamped, the improvement which comprises compressing one side of the abutted ends more than the other to produce a relatively thicker sectioned wall portion along the splice on said one side than on the other side.

3. In the method of splicing an uncured rubber tube by rendering the tube ends tacky, clamping the flattened tube ends in mating abutment by frictionally engaging the opposite sides of the ends, and longitudinally compressing the abutted ends while so clamped, the improvement which comprises compressing the abutted ends along the entire length of the splice on one side of the tube more than the other side to produce on said one side a relatively thicker sectional wall portion.

4. In the method of splicing an uncured rubber tube by rendering the tube ends tacky, clamping the flattened tube ends in mating abutment by frictionally engaging the opposite sides of the ends, and longitudinally compressing the abutted ends while so clamped, the improvement which comprises initiating the compression of the abutted ends on one side only of the tube and thereafter compressing both sides simultaneously, the other side thus being less compressed than said one side whereby a relatively thick sectioned tube portion is formed along the splice on said one side.

5. The method of splicing rubber tubes which comprises flattening the ends thereof, cutting the ends to provide tacky surfaces, abutting the cut ends, gripping the tube on opposite sides of the abutting ends between pairs of spaced clamping members some of which have relatively sharp pointed serrated edges disposed along the tube ends with the points of the serrated edge directed toward the splice, and moving the pairs of clamping members toward one another after the rubber material has flowed into the serrations, the serrated members being moved relatively farther than the other members to provide a relatively greater mass movement of the rubber tube portions engaged by the serrated members.

6. The method of splicing rubber tubes which comprises flattening the ends thereof, cutting the ends to provide tacky surfaces, abutting the cut ends, gripping the tube on opposite sides of the abutting ends between pairs of spaced clamping members, corresponding members of each pair having relatively sharp pointed serrated edges disposed along the tube ends with the points of the serrations on one member directed toward the serrations of the other member, and moving the pairs of clamping members toward one another after the rubber material has flowed into the serrations the serrated member of each pair being moved relatively farther than the other member to provide a relatively greater mass movement of rubber tube portions engaged by the serrated members, said serrated members forming a rind in which the serrated edges are in staggered relation.

7. The method of splicing rubber tubes which comprises flattening the ends thereof, cutting the ends to provide tacky surfaces, abutting the cut ends, gripping the tube on opposite sides of the abutting ends between pairs of spaced clamping members, corresponding members of each pair having relatively sharp pointed serrated edges disposed along the tube ends with the points of the serrations on one member directed toward the serrations of the other member, and moving the pairs of clamping members toward one another after the rubber material has flowed into the serrations, the serrated member of each pair being moved relatively farther than the other member to provide a relatively greater mass movement of the rubber tube portions engaged by the serrated members.

References Cited in the file of this patent

UNITED STATES PATENTS

| Number | Name | Date |
| --- | --- | --- |
| 638,188 | Smith | Nov. 28, 1899 |
| 1,291,948 | Lister | Jan. 21, 1919 |
| 1,317,665 | Orr | Sept. 30, 1919 |
| 1,317,976 | Hower | Oct. 7, 1919 |
| 1,416,252 | Blynt | May 16, 1922 |
| 1,613,089 | Ellinwood | Jan. 4, 1927 |
| 2,024,578 | Haase | Dec. 17, 1935 |
| 2,186,286 | Engler et al. | Jan. 9, 1940 |
| 2,254,596 | Breth et al. | Sept. 2, 1941 |

FOREIGN PATENTS

| Number | Country | Date |
| --- | --- | --- |
| 21,964 | Great Britain | of 1901 |
| 1,909 | Great Britain | of 1912 |
| 10,712 | Great Britain | of 1913 |
| 13,101 | Great Britain | of 1901 |